US006421338B1

(12) United States Patent
Byers et al.

(10) Patent No.: US 6,421,338 B1
(45) Date of Patent: Jul. 16, 2002

(54) NETWORK RESOURCE SERVER

(75) Inventors: Charles Calvin Byers, Aurora; Michael Hirsh Cooper, Oak Park; Robert Leroy Lien, Batavia, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/092,777

(22) Filed: Jun. 5, 1998

(51) Int. Cl.$^7$ .......................... H04L 12/66; H04M 7/00
(52) U.S. Cl. ........................... 370/352; 379/219
(58) Field of Search .................. 379/229, 230, 379/219, 220, 221; 370/352, 356, 401; 709/218, 219

(56) References Cited

U.S. PATENT DOCUMENTS

| 5,381,471 A | | 1/1995 | Balakrishnan et al. ...... 379/269 |
| 5,867,494 A | * | 11/1996 | Krishnaswamy et al. ... 370/352 |
| 6,084,956 A | * | 9/1997 | Turner et al. .............. 379/230 |
| 6,125,177 A | * | 9/1997 | Whittaker .................... 379/243 |
| 5,940,598 A | * | 8/1999 | Strauss et al. .............. 709/249 |

FOREIGN PATENT DOCUMENTS

| WO | WO 9638018 | 11/1996 | ........... H04Q/11/04 |
| WO | WO 9722210 | 6/1997 | ............ H04Q/3/00 |

OTHER PUBLICATIONS

C. Low et al., "WebIN –An Architecture For East Deployment Of IN–based Personal Services", Workshop Record. Intelligent Network. Freedom And Flexibility: Realising The Promise Of Intelligent Network Services, Apr. 21, 1996, pp. 1–12.

R. Babbage et al., "Internet Phone –Changing The Telephony Paradigm", BT Technical J., vol. 15, No. 2, Apr. 1997, pp. 145–157.

* cited by examiner

Primary Examiner—Harry S. Hong
Assistant Examiner—Hector Agdeppa

(57) ABSTRACT

A network resource server is deployed in a convergent telecommunications network for providing traditionally service circuit type applications to both circuit switches and packet switches of the convergent network. The network resource server includes a variety of processors for accommodating specific application requests from nodes within the convergent network. Advantageously, the network resource server has a greater capacity than traditional service circuit nodes and is able to serve both the circuit-based network elements and packet-based network elements in a convergent network. For this reason, the network resource server eliminates the need for traditional service circuit nodes and various types of data servers.

9 Claims, 3 Drawing Sheets

NETWORK RESOURCE SERVER

TECHNICAL FIELD

This invention relates to telecommunications networks and, more particularly, to the convergence of voice telecommunications networks and packet data transport networks.

BACKGROUND OF THE INVENTION

The public switched telephone network (PSTN) is in a state of evolution. The ever present demand for faster, more efficient transport of information across network resources, coupled with the desire for more advanced features and applications has sparked experimentation and innovation in the telecommunications industry.

One manifestation of the evolving public switched telephone network is the convergence of voice and data networks (hereinafter, "convergent networks") for providing telecommunications services. Traditionally, voice networks send information among nodes via well established signaling links and protocols. Packet-based data networks extend packets of digitized data over packet-based links using protocols completely different from circuit-based protocols. Packet-based data networks (such as the Internet) are traditionally utilized to interconnect computing systems. The telecommunications industry is realizing, however, that the convergence of circuit based and packet-based networks into a conglomerate produces a network with an immense capacity for voice and data transmission.

In traditional voice networks, features and applications including, but not limited to, announcement playback, automatic speech recognition and echo cancellation are provided by service circuits which have the hardware and software capability necessary for executing a variety of functions. Providing a function equivalent to the service circuit in a convergent network is challenging for it requires accommodation of both circuit-based and packet-based links and protocols.

SUMMARY OF THE INVENTION

It has been recognized that there is a need for providing service applications with a high degree of flexibility and equal efficiency to circuit-based and packet-based portions of a convergent telecommunications network. This need is addressed and a technological advance is achieved in the telecommunications art by a network resource server (NRS) element for providing many different classes of service circuit and server functions. The NRS can be initially connected to synchronous, circuit based facilities and, as a network migrates towards convergence, can transparently continue to provide service circuit type functions to both the packet-based and circuit based portions of the convergent network. Ultimately, in some embodiments the NRS will serve in only packet-based systems.

In one embodiment, the NRS is interconnected via circuit based transport links to at least one element (node) in a circuit-based network. The NRS is also interconnected via packet-based links to at least one node in a packet-based network. By maintaining interconnections to the circuit and packet portions of the convergent network, the NRS provides features and application functions to both portions of the convergent network.

More particularly, the NRS includes circuit based interfaces and packet-based interfaces managed by a controller interconnected to the interfaces via a high speed backplane. The high speed backplane is designed for both circuit and packet traffic. In one exemplary embodiment, the NRS also includes a plurality of digital signal processors, high powered reduced instruction set computing (RISC) processors and at least one custom processor for accommodating a variety of features and applications as may be required in the convergent network. The NRS also includes substantial random access memory (RAM) and a pointer processor contained within the RAM for providing multicast services to subscribers of the convergent network. A redundant array of an expensive disk is also included in the NRS to allow for bulk storage of memory intensive service functions such as announcements, movies on demand or web pages. In alternative embodiments, the NRS includes some subset of the above-mentioned components as appropriate for the needs of the network.

Advantageously, the NRS can replace all existing service circuit nodes within a traditional circuit based telecommunications system while maintaining sufficient capacity to serve all packet-based requests in a convergent or packet telecommunications system. The enhanced capacity of the NRS along with its flexible design and ability to provide a variety of features and applications results in cost savings and enhanced efficiency to service providers who choose to implement such an element in their convergent networks.

DETAILED DESCRIPTION

Figure 1:
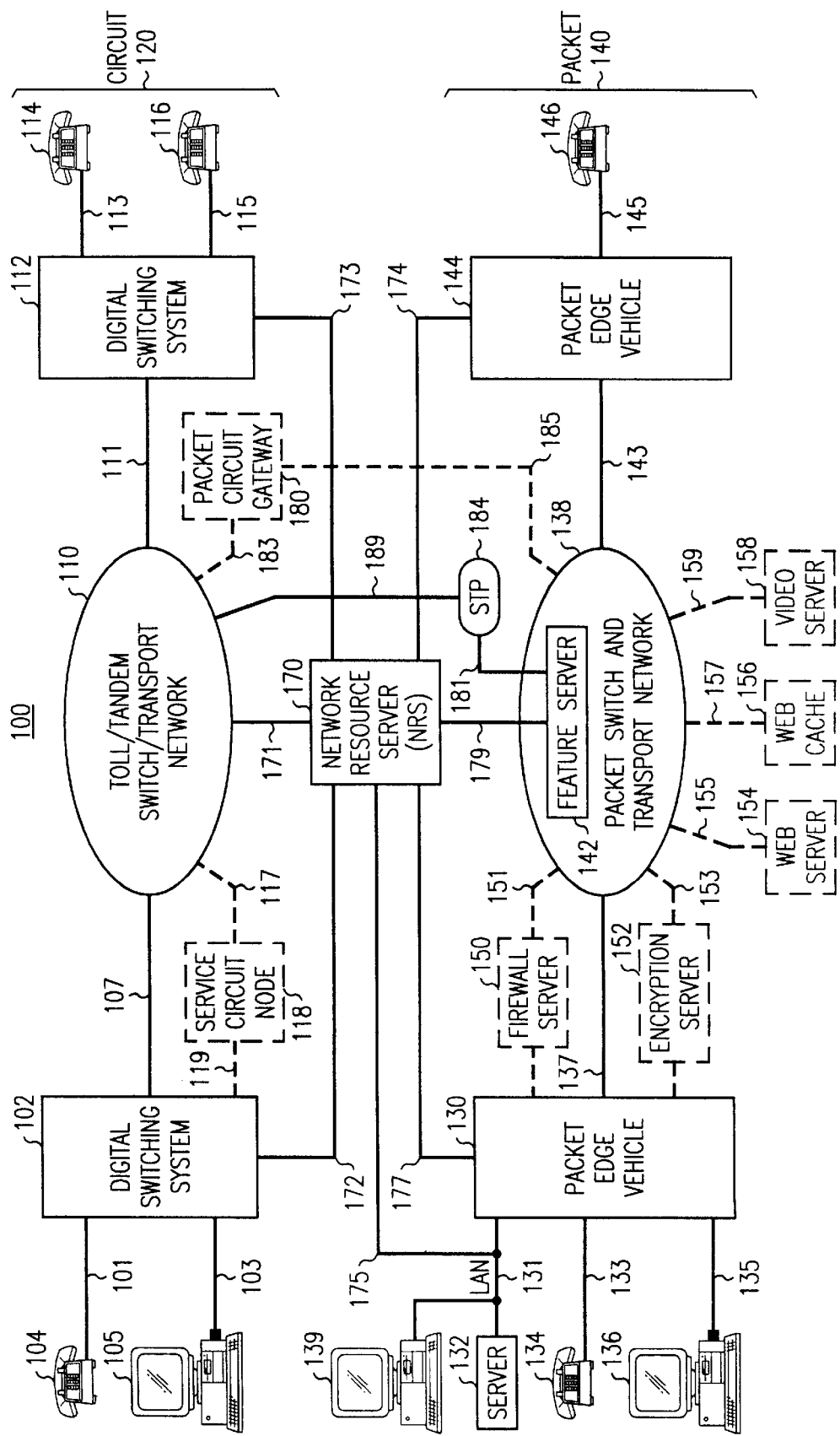
FIG. 1 is a simplified block diagram of a convergent telecommunications network including an NRS.

FIG. 1 is a simplified block diagram of convergent telecommunications network 100 including circuit-based portion 120 and packet-based portion 140. In this embodiment, network resource server 170 serves both the circuit-based and packet-based portions of the convergent network. In alternative embodiments, NRS 170 may serve only a packet or circuit network.

Digital switching system 102 operates in a circuit-based portion of the convergent network and serves telephone 104 and personal computer and modem 105 via subscriber lines 101 and 103, respectively. Digital switching system 102 is interconnected to a plurality of toll/tandem switches represented by toll/tandem switching and transport network 110. More particularly, digital switching system 102 is interconnected to toll/tandem switch network 110 via trunk 107. Toll/tandem switch network 110 is interconnected to digital switching system 112 via trunk group 111. In this example, digital switching system 112 serves telephones 114 and 116 via subscriber lines 113 and 115, respectively. In the preferred embodiment, both digital switching systems 102 and 112 are the 5ESS® switching system manufactured and sold by Lucent Technologies Inc.

Also shown is service circuit node 118 interconnected to toll/tandem switch network 110 and digital switching system 102 via links 117 and 119, respectively. Service circuit node 118 and links 117 and 119 are shown in phantom form to indicate that these components of convergent network 100 are eliminated by deployment of an NRS, as described below.

The packet-based portion of convergent network 100 comprises packet edge vehicle 130 which serves network server 132, telephone 134 and personal computer 136. In this embodiment, network server 132 is interconnected to edge vehicle 130 via local access network (LAN) link 131. LAN link 131 also serves personal computer 139 via link 131. Telephone 134 and personal computer 136 are interconnected to packet edge vehicle 130 via subscriber lines 133 and 135, respectively. In the preferred embodiment, packet edge vehicle 130 is a PAthStar® Access Server manufactured and sold by Lucent Technologies Inc. Packet edge vehicle 130 is interconnected to packet network 138 via dedicated packet link 137. Packet network 138 comprises a plurality of routers or packet switches interconnected via a non-circuit based transport mechanism, such as asynchronous transfer mode (ATM) or via Internet protocol over SONET links. Packet network 138 includes feature server 142 which is described in detail below. In this embodiment, packet network 138 is interconnected to packet edge vehicle 144 via packet-based link 143. Packet edge vehicle 144 serves telephone 146 via subscriber line 145.

Also shown in phantom are firewall server 150, encryption server 152, web server 154, web cache 156, and video server 158. Firewall server 150 and encryption server 152 are interconnected to packet edge vehicle 130 and packet network 138 via links 151 and 153 also shown in phantom to indicate that these elements are obsolete by deployment of NRS 170. Similarly, web server 154, web cache 156 and video server 158 are interconnected to packet network 138 via phantom links 155, 157 and 159.

Network resource server 170 is interconnected to circuit-based portion 120 and packet-based portion 140 of convergent telecommunications network 100. More particularly, NRS 170 maintains circuit based links 171, 172 and 173 to toll/tandem switch network 110, digital switching system 102 and digital switching system 112, respectively. NRS 170 maintains packet-based links 174, 175, 177 and 179 to elements in the packet-based portion of the convergent telecommunications network. More particularly, NRS 170 maintains link 174 to packet edge vehicle 144 and link 175 to LAN link 131. NRS 170 maintains link 177 to packet edge vehicle 130. NRS 170 maintains link 179 to feature server 142 within packet network 138. Feature server 142 controls NRS 170 in accordance with needs of subscribers associated with convergent telecommunications network 100. To this end, feature server 142 maintains circuit-based link 181 to signal transfer point 184 in circuit-based portion 120 of convergent network 100. Signal transfer point 184 is interconnected to toll/tandem switch network 110 via link 189 and issues some circuit type application requests to feature server 142 in those networks in which service circuit nodes are eliminated. Service circuit nodes and applications thereof are described in detail in U.S. Pat. No 5,381,471 which is hereby incorporated by reference.

Network resource server 170 performs a variety of service features or applications as required by subscribers of convergent telecommunications network 100. These service features and applications include voice service type applications, multimedia service circuit type applications, signaling applications, filtering applications and web-related data applications. For example, NRS 170 provides voice gateway type functions including acting as a gateway between circuit-based portion 120 and packet-based portion 140. In this manner, NRS 170 serves as the conduit connecting the two portions of the convergent network and eliminates the traditional function of packet circuit gateway 180 and its links 183 and 185 to toll/tandem network 110 and packet network 138, respectively. NRS 170 also provides network echo cancellation, acts as an Internet telephony compression engine and serves as an international gateway interconnecting convergent telecommunications network 100 with other networks via packet network 138.

Network resource server 170 performs voice service circuit type functions by providing bulk dual tone multiple frequency (DTMF) tone detection, storing announcements, performing automatic speech recognition and text-to-speech synthesis and acting as a voice dialing host. Significantly, NRS 170 provides voice circuit-based applications, such as those described above, from an entity with established connections to a packet transport network. Indeed, in some embodiments, a non-convergent circuit based network (that is, a pure, traditional voice network) may be serviced by an NRS associated with another convergent or packet-only network. NRS 170 is capable of providing multimedia services such as teleconferencing, video conferencing and acting as a multimedia bridge. NRS 170 is also capable of acting as an Internet call waiting host and as a voice mail host.

Due to its ability to be connected to both circuit based portion 120 and packet-based portion 140 of convergent telecommunications network 100, NRS 170 is a natural conversion source between circuit-based protocols and packet-based protocols. It may also act as a service circuit node with modem capability. In this regard, it may serve as a telecommunications device for the deaf (TDD) bulk terminal, act as a facsimile store and forward engine and act as a remote access server or modem pool. NRS 170 eliminates the need for firewall servers by its ability to act as a high capacity Internet filter. Functionalities previously performed by web server 154, web cache 156 and 158 are all performed by NRS 170 when it acts in its data service circuit mode. NRS 170 also provides both encryption or decryption engines.

Figure 2:
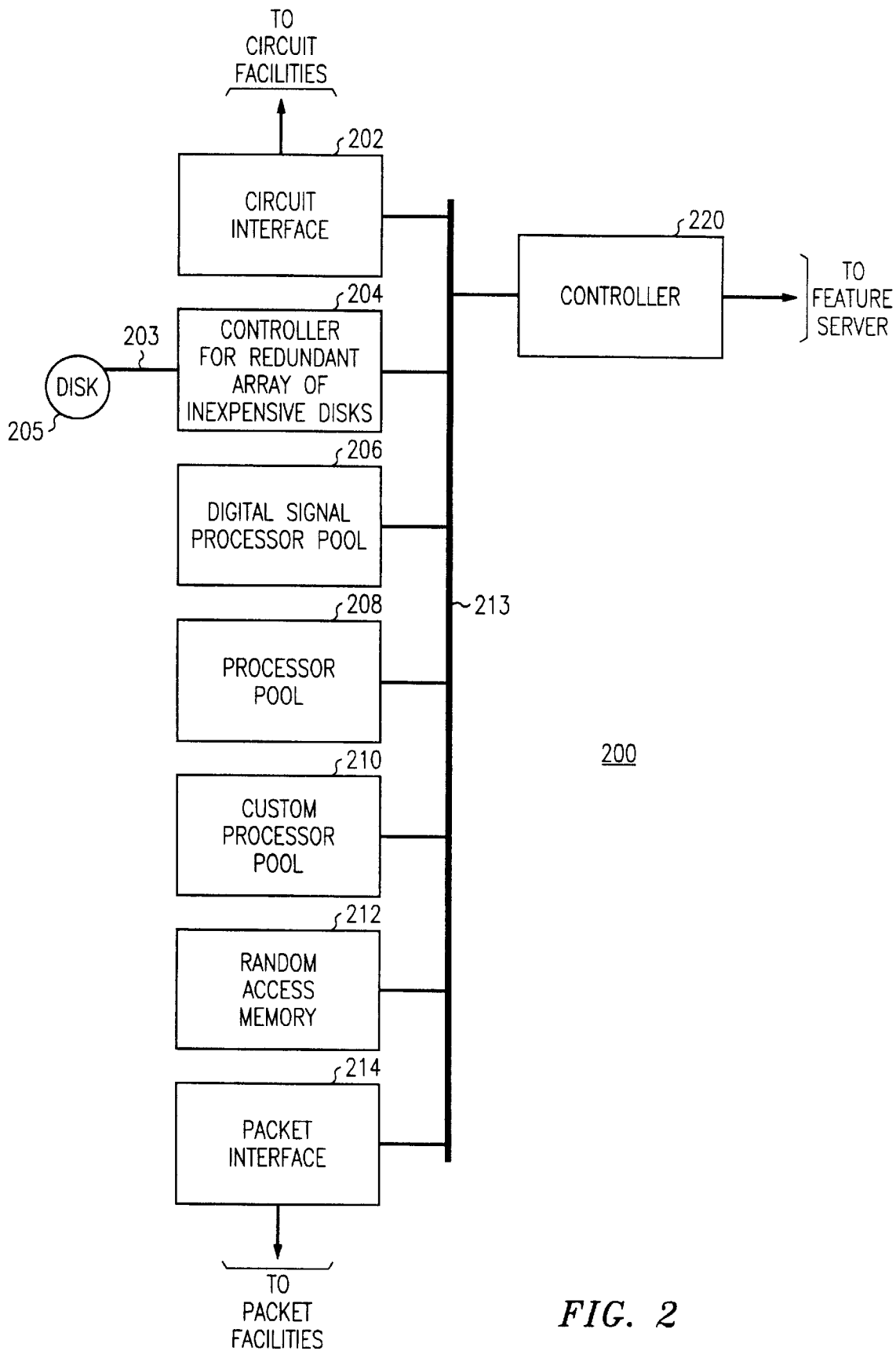
FIG. 2 is a more detailed block diagram of the NRS shown in FIG. 1.

FIG. 2 is a more detailed diagram of an NRS 170 shown in FIG. 1. More particularly, NRS 170 is shown to include a plurality of functional entities 202 through 214 interconnected to each other and controller 220 via high speed backplane 213. High speed backplane 213 is capable of connecting circuit and packet end points at high speed.

Circuit interface 202 serves as an interconnection point between NRS 200 and circuit-based network elements within a convergent network. With reference to FIG. 1 described above, circuit interface 202 receives and processes information from circuit-based links 171, 172 and 173. Similarly, packet interface 214 receives and processes packet-based information from the rest of the convergent telecommunications network. With reference to FIG. 1, packet interface 214 receives and processes information from packet-based links 174, 175, 177 and 179. In alternative embodiments, NRS 170 may include only a circuit interface or only a packet interface.

Controller 204 manages a redundant array of inexpensive disks (RAID) 205 interconnected to server 204 via fibre channel or small computer systems interconnect (SCSI) 203. Disks 205 store applications or features which require a great amount of memory space, such as bulk announcements, movies on demand, web pages or billing data.

Digital signal processor pool 206 comprises a plurality of digital signal processors designed for performing specific applications. The digital signal processor pool is best suited for performing "multiply and accumulate" intensive algorithms. More particularly, the digital signal processor pool deployed in NRS 170 typically performs packet or circuit gateway type functions, bulk DTMF tone detection, teleconferencing, Internet call waiting, voice mail host functions, facsimile storage and forwarding and remote access server functions as required by subscribers of convergent network 100. On the contrary, high performance processor pool 208 comprises a plurality of high performance microprocessors. This processor pool is best suited to handle complex operations and large memory contexts. In this embodiment, RISC processor pool 208 serves functions previously performed by automatic speech recognition systems, firewall servers, web servers, web caches or video servers. Custom processor pool 210 is designed for accommodating those applications which require custom programming. An example of custom programming is a video bridge. Random access memory 212 is used to store data such as movies on demand, web pages or billing data not stored in RAID 205.

Functional entities 202 through 214 operate in response to instructions received from controller 220 via high speed backplane 213. High speed backplane 213 is designed to receive circuit-based instructions directly from circuit portion 120 or packet based instructions from feature server 142. In the exemplary embodiment, the feature server receives requests from either a packet network or a circuit-based network. These requests relate to specific applications requested by subscribers served by a pure circuit based system, a pure packet system or a convergent telecommunications network. Feature server 142 processes the request and extends it to NRS controller 220 via a packet-based link. In this manner, the NRS receives the request, processes the request and extends data to the requesting end source via established circuit-based or packet-based links. Accordingly, a single NRS can serve an entire convergent telecommunications network and eliminate the need for separate service circuit nodes, or web server type functional units.

Figure 3:
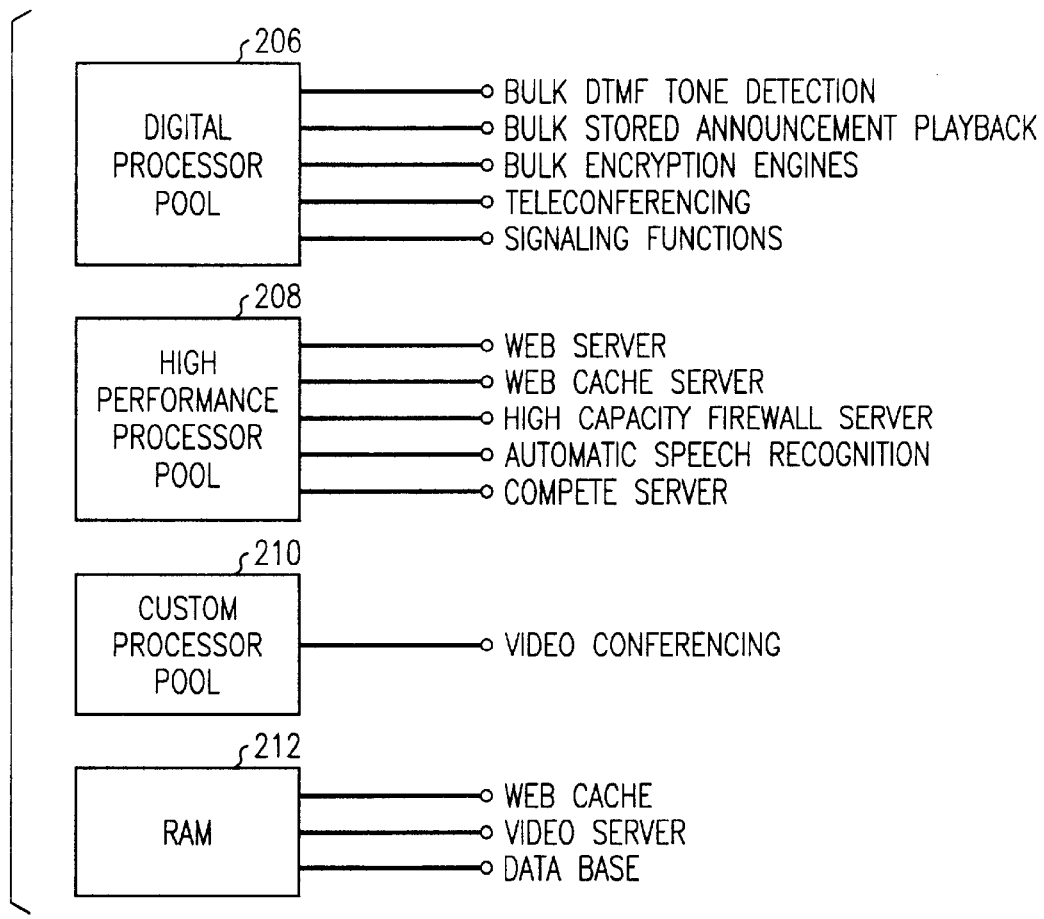
FIG. 3 is a graphic representation of exemplary applications of the various types of processors found in an NRS as shown in FIG. 2.

FIG. 3 is a graphical representation of the various types of applications performed by the processors in NRS 170. Importantly, not all applications of an NRS require each type of processor pool. Indeed, the NRS can be customized to include any subset of digital processors, high performance processors or customized processors.

In the illustrative embodiment described above, digital processor pool 206 is responsible for voice circuit type applications such as bulk DTMF tone detection, bulk stored announcement playback, teleconferencing and signaling functions. High performance (RISC) processor pool 208 is responsible for packet type applications such as acting as a web server, high capacity firewall server, compete server or automatic speech recognition. In this embodiment, custom processor pool 210 provides video server applications designed for convergent telecommunications network 100. RAM 212 acts as a web cache, video server and database. Some applications require the cooperation of several different processor and RAM brand types.

Advantageously, the flexibility of the NRS to be customized to a specific network along with its immense capacity to provide service applications for voice and/or data transmissions enables this network element to become a cost efficient and reliable means for providing service circuit functions.

Although this invention has been described with respect to a preferred embodiment, those skilled in the art may devise numerous other arrangements without departing from the scope of the invention as defined in the following claims.

What is claimed is:

1. A method for providing enhanced telecommunications services in a telecommunications network including circuit-based elements and packet-based elements, the method comprising the steps of:
    establishing an interconnection between a circuit-based network element and a network resource server;
    establishing an interconnection between a packet-based network element and the network resource server;
    implementing a first specific application to the circuit-based network element from the network resource server to provide a service node function, wherein said first specific application is executed on the network resource server and is one of a group of first specific applications including: dual tone multiple frequency detection, automatic speech recognition, and interactive voice response operation;
    implementing a second specific application to the packet-based network element from the network resource server, wherein said second specific application is executed on the network resource server and is one of a group of second specific applications including: packet-based filtering, compression, decompression, encryption, decryption and a firewall; and
    wherein the step of implementing a first specific application to the circuit-based network element from the network resource server further comprises the steps of receiving a request for service from the circuit-based network element, processing the request and extending data to the circuit-based network element.

2. The method of claim 1 further comprising the step of implementing said first specific application to the packet-based network element from the network resource server.

3. The method of claim 2 further comprising the step of implementing the second specific application to the circuit-based network element from the network resource server.

4. The method of claim 1 further comprising the step of providing an additional specific application to a packet-based network element or a circuit-based network element from the network resource server, wherein the additional specific application is at least one of a group of additional specific applications including announcement playback, echo cancellation, web-related data applications and multimedia service circuit type applications.

5. The method of claim 1 wherein the step of implementing a second specific applications to the packet-based network element from the network resource server further comprises the steps of receiving a request for service from the packet-based network element, processing the request and extending data to the packet-based network element.

6. The method of claim 1 wherein the step of implementing a first specific application to the circuit-based network element from the network resource server further comprises the step of storing signaling functions in the network resource server.

7. The method of claim 1 wherein the step of implementing a second specific application to the packet-based network element from the network resource server further comprises the step of storing packet-based filtering applications in the network resource server.

8. A network resource server for providing enhanced telecommunications services in a telecommunications network including circuit-based elements and packet-based elements comprising:
    means for establishing an interconnection between a circuit-based network element and the network resource server;
    means for establishing an interconnection between a packet-based network element and the network resource server;

means for implementing at least one of a group of first specific applications to the circuit-based network element from the network resource server to provide service node functions, wherein said at least one of the group of first specific applications is requested by the circuit-based network element and executes on the network resource server to produce data that is returned to the circuit-based network element, and wherein said group of first specific applications includes: a dual tone multiple frequency detection application and an automatic speech recognition application; and means for implementing at least one of a group of second specific applications to the packet-based network element from the network resource server, wherein said group of second specific applications executes on the network resource server and includes: packet-based filtering, compression, decompression, encryption, decryption and a firewall.

9. The network resource server of claim 8 wherein the means for establishing an interconnection between a circuit-based network element and the network resource server further comprises a circuit interface and wherein the means for establishing an interconnection between a packet-based network element and the network resource server comprises a packet interface and said circuit interface and said packet interface are interconnected to each other and a controller over a backplane.

* * * * *